United States Patent
Marland

(10) Patent No.: US 7,927,321 B2
(45) Date of Patent: Apr. 19, 2011

(54) PORTABLE SLING TOILET

(75) Inventor: Scott Kenneth Marland, Bountiful, UT (US)

(73) Assignee: Scott K Marland, Bountiful, UT (US)

( * ) Notice: Subject to any disclaimer, the term of this patent is extended or adjusted under 35 U.S.C. 154(b) by 0 days.

(21) Appl. No.: 11/399,154

(22) Filed: Apr. 6, 2006

(65) Prior Publication Data

US 2006/0235359 A1    Oct. 19, 2006

Related U.S. Application Data

(60) Provisional application No. 60/672,482, filed on Apr. 19, 2005.

(51) Int. Cl.
*A61F 5/44*    (2006.01)
(52) U.S. Cl. .................. 604/353; 604/317; 182/9; 182/3
(58) Field of Classification Search .................. 604/317, 604/322, 327, 353; 182/7, 9, 187, 3–4; 540/541–544
See application file for complete search history.

(56) References Cited

U.S. PATENT DOCUMENTS

| | | | | | |
|---|---|---|---|---|---|
| 2,834,525 | A | * | 5/1958 | Shawgo | 182/9 |
| 2,879,830 | A | * | 3/1959 | Johnson | 182/9 |
| 3,664,460 | A | * | 5/1972 | Zdroik | 182/187 |
| 4,747,527 | A | * | 5/1988 | Trumpower, II | 224/662 |
| 4,903,355 | A | * | 2/1990 | Hickerson | 5/83.1 |
| 5,172,966 | A | * | 12/1992 | Myatt | 312/34.8 |
| D361,889 | S | * | 9/1995 | Rhines | D3/261 |
| D411,659 | S | * | 6/1999 | Karton | D3/226 |
| 6,019,194 | A | * | 2/2000 | Loomis et al. | 182/187 |
| 6,142,567 | A | * | 11/2000 | Bentley | 297/273 |
| 6,966,439 | B2 | * | 11/2005 | Weleczki | 206/315.3 |
| 7,552,904 | B2 | * | 6/2009 | Zehnder et al. | 248/682 |
| 2003/0005513 | A1 | * | 1/2003 | Figueras | 4/483 |

* cited by examiner

*Primary Examiner* — Michele Kidwell

(57) ABSTRACT

A reliable, private and sanitary device is provided for capturing human waste in the wilderness. A small double ended bag contains a roll of toilet paper in one end and an extendable padded strap in the other. A user pulls the padded strap from the bag, loops it around a tree and around the user's body, and attaches its end to the other end of the strap after extending that end of the strap from the other end of the bag. Then the user can lean back against the padded strap, and deposit bodily waste in a collection bag. The device is light, portable, reusable, and suitable for use by hikers, rafters, and other outdoor enthusiasts in areas where human waste is carried out rather than left behind.

7 Claims, 4 Drawing Sheets

PORTABLE SLING TOILET

RELATED APPLICATION

This application claims priority to commonly owned application Ser. No. 60/672,482 filed Apr. 19, 2005, which is incorporated herein by reference.

BACKGROUND OF THE INVENTION

While camping or spending time outdoors it is, from time to time, necessary to relieve oneself (defecate and/or urinate). In the absence of plumbed toilet facilities, pit toilets, chemical toilets, or similar toilets this task is less comfortable and can pollute the environment with uncontained and untreated waste. Some efforts have been made to provide alternatives for human waste capture, containment, and disposal in rural or wild environments.

For example, United States Published Patent Application No. 20060031982 to Pittman describes a portable personal waste disposal unit. The personal waste disposal unit includes a container having a top surface with a removable cap covering an opening. The opening is oval in shape and leads to an interior of the disposal unit. The container includes a tissue and privacy sheet. The privacy sheet may be used to cover an individual using the personal waste disposal unit. The disposal unit may be sized to fit under an automobile seat. When using the disposal unit, the cap is removed from the top surface, thereby allowing the individual to deposit bodily waste through the opening into the interior. The container is strong enough to hold the weight of an individual. After use, the cap is placed over the opening. The disposal unit may then be discarded as desired by the user.

United States Published Patent Application No. 20060037131 to Payne describes a collapsible portable toilet which includes a chair frame including a built-in foldable seat with a hole, a seat back, four legs and two front wheels, a disposable absorbent fragrant flexible refuse bag extending through the hole in the seat and draped around an outer perimeter of the seat, the refuse bag attached to an underside of the seat, a roof support frame comprising parallel telescoping vertical rods extending from a rear of the seat and attached to the seat back, a roof comprising parallel rods connected to a top of the roof support frame at a pivot point, the roof rotatable at the pivot point to and from a stored position. A bag can be removably attached to a top of the roof having curtain material to be draped around the roof support frame and roof for privacy, the curtain material having reflectors on an outside and in inside pockets.

United States Published Patent Application No. 20010034904 to Phillips describes a disposable waste bag pack for use with a toilet which has a toilet seat and includes a first disposable bag which includes a zip-lock top first bag portion. A second disposable bag includes an expandable second bag top portion and a second bag bottom portion, and the second bag top portion is sized to fit over the toilet seat. Also, the second bag bottom portion is sized to fit into the first disposable bag which extends below the toilet seat. A third disposable bag includes a quantity of toilet paper and a hand wipe package. The third disposable bag and its contents are stored inside the first disposable bag prior to use of the first disposable bag for retaining waste products. A directions sheet is also provided. The second disposable bag includes a pair of pleated side walls. A quantity of waste treating chemicals are contained inside the second disposable bag. The waste treating chemicals include an admixture comprising a powdered gelling agent, a powdered odor neutralizer, and a powdered decay catalyst. member.

United States Published Patent Application No. 20010007934 to Smith describes a portable elimination device including a portable container for receiving human waste products, in particular, urine and fecal matter. In a first embodiment for micturition by males, the device is a cylinder having an outside layer made from a pliable, liquid impermeable plastic and an inside layer made from a soft, absorbent material. The device includes a pair of foldable flaps at the open mouth of the cylinder and a bead and groove seal to close the mouth of the cylinder for disposal after use. In a second embodiment for micturition by females, the device is generally rectangular with rounded corners having an outside layer made from a pliable, liquid impermeable plastic and an inside layer made from a soft, absorbent material. A flap is attached to one end of the outside layer and flexible shroud is attached to an opposing end of the outside layer, so that, after use, the flap is used to fold the device in half and the shroud is pulled over the doubled up layers for disposal. In a third embodiment for receiving solid waste, the device includes an inflatable, cylindrical chamber having a well defined therein. A liquid impermeable plastic bag is placed over the chamber, the bottom of the bag having a layer of absorbent material chemically treated to reduce odor being disposed in the bottom of the well, the mouth of the bag being retained to the outer wall of the chamber by fabric hook-and-loop fastening material. After use, the bag is tied for disposal.

A portable toilet is also described online at www dot outbackpack dot corn (hyperlinks herein have been disabled and are not intended to be active, pursuant to USPTO policy). A seat is formed of double wall corrugated paperboard, with wall panels and a top having a hole. The toilet is deployed by unfolding and positioning the panels, and a waste bag is placed under the hole in the top of the seat. Toilet paper can be mounted on a side panel using double-sided tape.

Some personal portable sanitation systems are described online at www dot whennaturecalls dot corn. Disposable urine bags contain absorbent polymers and enzymes that will absorb urine. A one-way valve prevents spillage. Deodorants are added to the polymers to eliminate odors. Another product discussed is a "bag within a bag", said to be patented, for containing and neutralizing solid human waste. The outer bag is gas-impervious, and the product includes polymers and deodorizers designed for solid waste. The bag provides a means to pack out solid waste when camping or hiking. It can be used with a commode, or directly on the ground in wilderness situations.

Other aspects of waste management technology, discussed herein or previously known to those of skill in the art, may also be helpful in understanding the present invention.

SUMMARY OF THE INVENTION

One embodiment of the present invention is a double ended bag (made of nylon fabric or similarly functional material) with an integral strap running (sewn or similar) through the middle. On one end of the strap (webbing, rope or similar) is a padded section used as a back support. Past the padded section is a fastening mechanism for fastening that end of the strap to the other. The other end of the strap has on its end the mating piece of the fastening mechanism. In this embodiment of the invention the second end is shorter than the first end, such that only several (approximately six) inches extend from the double ended bag. On that shorter end, in this embodiment, it is intended that a roll or toilet paper be place over the strap and into that end of the bag such that the strap runs through the center of the roll of toilet paper.

The invention in this embodiment is intended to be used by starting with the invention in its "storage" configuration. The storage configuration is such that the long end of the strap is placed into its corresponding end of the double ended bag (which is maintained shut by a method such as a drawstring, fabric hook-and-loop fastener closure or similar) and the toilet paper with the short end of the strap placed in its corresponding end of the double ended bag (also maintained in a closed position).

For use the long end of the strap is pulled from its end of the double ended bag (after opening) and wrapped around the user 200 such that the padded back support is place across the user's lower back or pelvis area then around a tree 212 (or similarly functioning structure such as attached to a rock, or automobile bumper). The fastening mechanism is then fastened to the short end of the strap after opening the short ends corresponding double ended bag end. After connecting both ends of the strap to each other, the toilet tissue/paper may be pulled out of the bag such that it hangs freely for dispensing. The user then prepares to defecate/urinate by removing clothing as necessary. The user then leans back against the padded back support with feet slightly towards the support structure (slowly to take up slack and allow partial weight support). The user then "does his/her business" (urinates and/or defecates).

The current embodiment of this invention also provides an attachment in the mid area of the padded back support for a "collection bag" (a standard plastic grocery sack is one option for a collection bag). The collection bag, when used is first attached to the back support then held forwards between the user's legs to collect excrement for proper disposal. Upon completion of the bodily functions, the strap and toilet tissue/paper can be stored back in the double ended bag.

Although examples are given herein, they are merely illustrative. The present invention is defined by the claims, and to the extent this summary and/or incorporated material from a parent priority document conflicts with the claims, the claims should prevail.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not fully determine the invention's scope. In the drawings.

DETAILED DESCRIPTION

In describing the invention, the meaning of several important terms is clarified, so the claims must be read with careful attention to these clarifications. Specific examples are given to illustrate aspects of the invention, but those of skill in the relevant art(s) will understand that other examples may also fall within the meaning of the terms used, and hence within the scope of one or more claims. Important terms may be defined, either explicitly or implicitly, here in the Detailed Description and/or elsewhere in the application file.

In particular, an "embodiment" of the invention may be a device (e.g., fixture alone, parts of fixture, fixture with toilet paper), system (e.g., fixture, bag, and support such as tree), an article of manufacture (e.g., fixture), or a method (e.g., using fixture).

Figure 1:
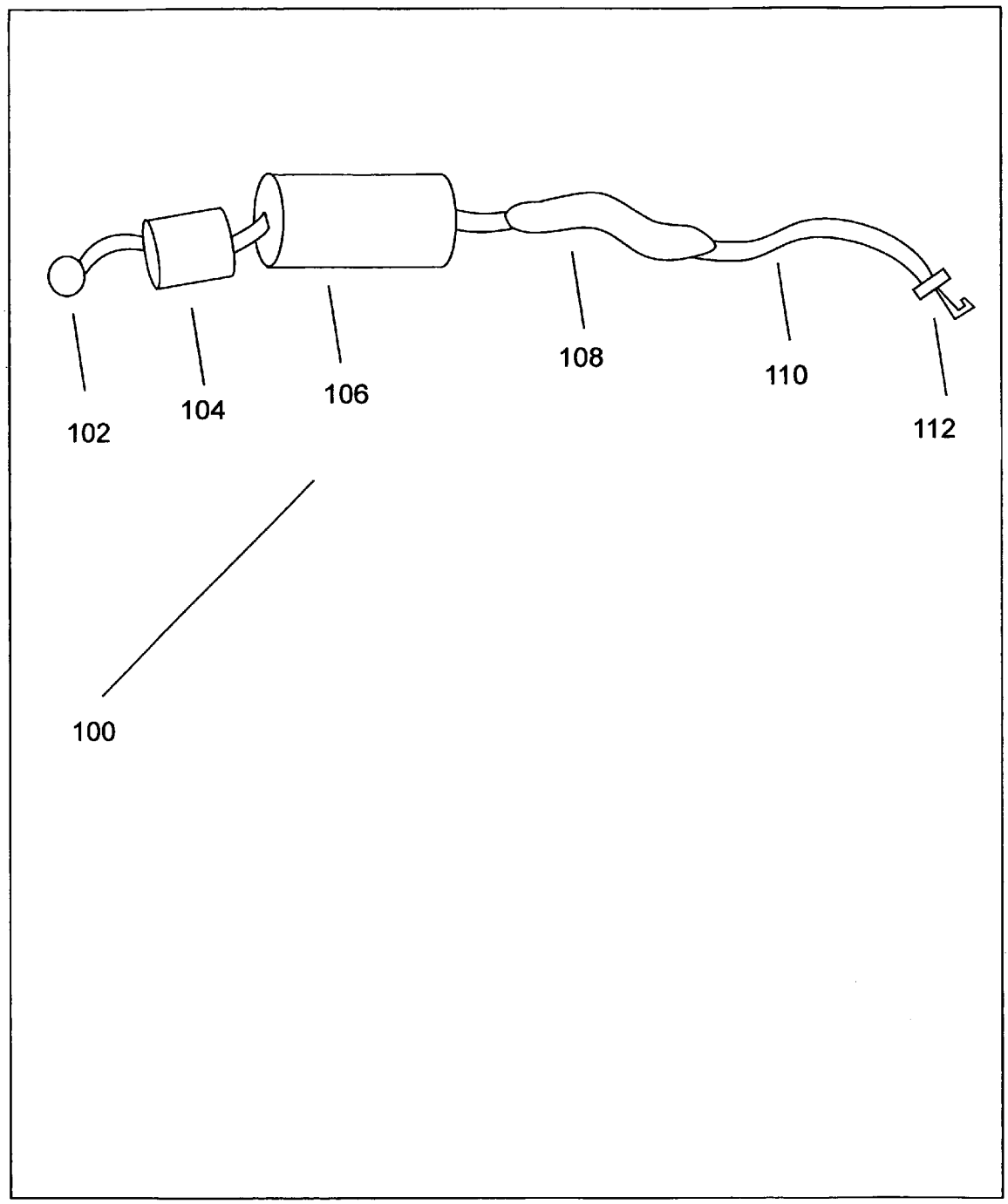
FIG. 1 is a form perspective view illustrating one embodiment of the present invention.

FIG. 1 shows one embodiment of the device 100. The device is shown in its extended position where it is pulled out of a double ended bag 106. The double ended bag (constructed of cloth such as nylon, plastic, or other similarly functional material) has methods for closure on both ends such as drawstring, drawcords, fabric hook-and-loop fastener closure or similar to keep the device contained when not in use. A strap 110 runs through, and is attached to an inside wall of, the double ended bag. In an alternate embodiment, a single ended bag (namely, a bag with only one open end) is used. The strap may be attached to the exterior of a bag 106, or the interior, in either the double ended embodiment or the single ended embodiment. If the strap is attached to the interior of a single ended bag, the bag may be turned at least partially inside-out when the device 100 is deployed for use.

In one embodiment of the invention the strap 110 is made at least partially of nylon webbing, but any suitably strong, similar material would be acceptable. Suitable materials include materials used for other load-bearing straps in camping, hiking, boating, spelunking, or other athletic activities. Attached to one end (the shorter end) of the illustrated strap is part of a fastening mechanism such as a hook and loop depicted as loop 102, and to the longer end is attached a mating portion of the fastening mechanism depicted as hook 112. The fastening mechanism in one embodiment, represented in these figures, is a hook 112 and loop 102. The fastening mechanism may be any means of attaching securely, but preferably temporarily, the two ends of the strap, including but not limited to items such as a carabineer, a hook, a buckle, a loop, or a knot.

Attached integrally to the long end of the strap near the double ended bag is a padded back band 108. The padding may include any construction means to reduce and/or distribute the pressure of the user over a larger area to increase comfort during use of the device. Such constructions could be, for example, foam padding, an inflatable air bladder, a gel-filled cushion, a wider strap, webbing materials, and/or similar means.

A roll of toilet paper 104 can be threaded over the short end of the strap. The toilet paper may then be slid out of the double ended bag (with the short end of the strap through the center of the roll) when in use, and stored within the double ended bag when not in use.

Figure 2:
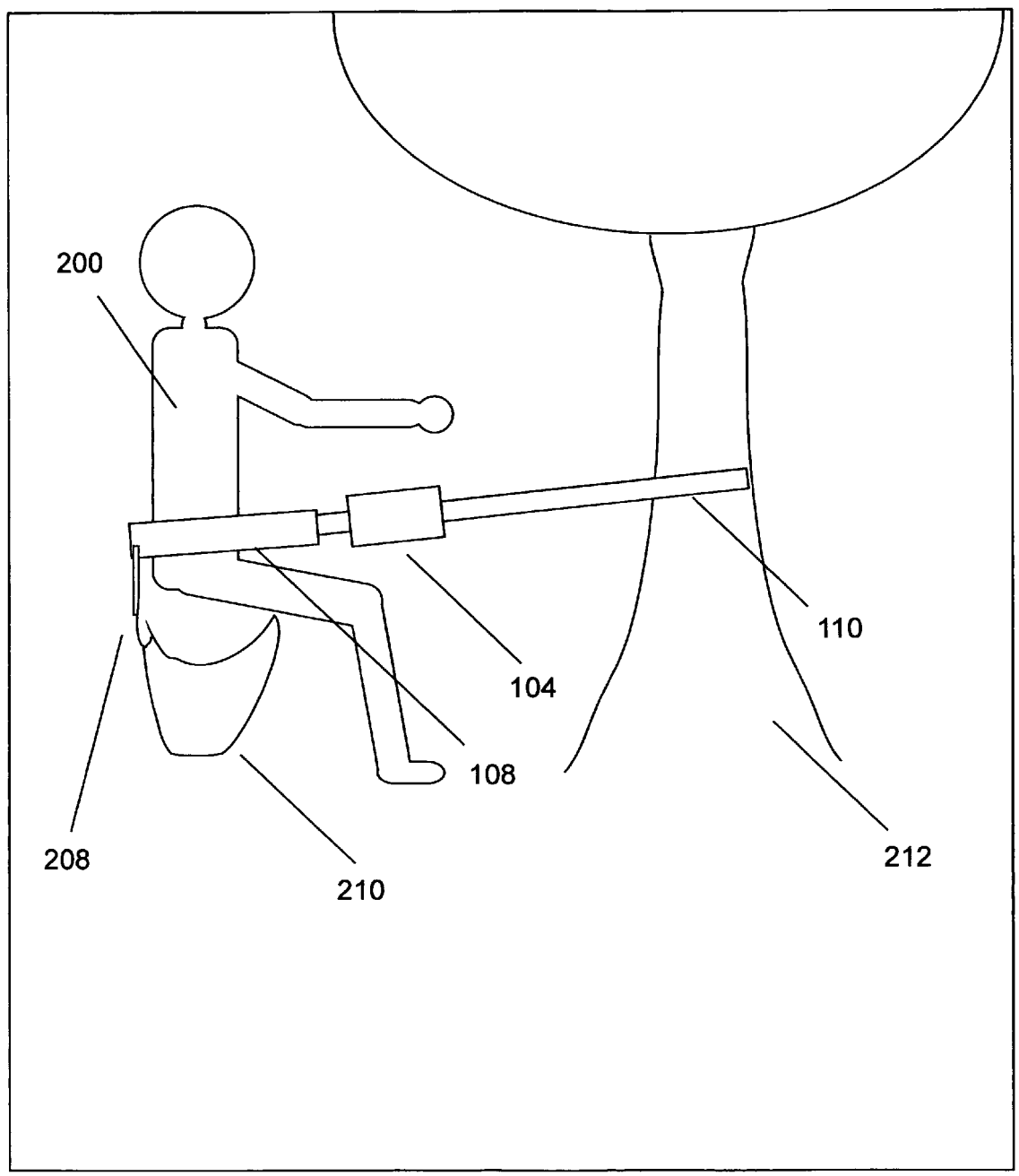
FIG. 2 is a perspective view of one embodiment of the invention deployed for use.
Figure 3:
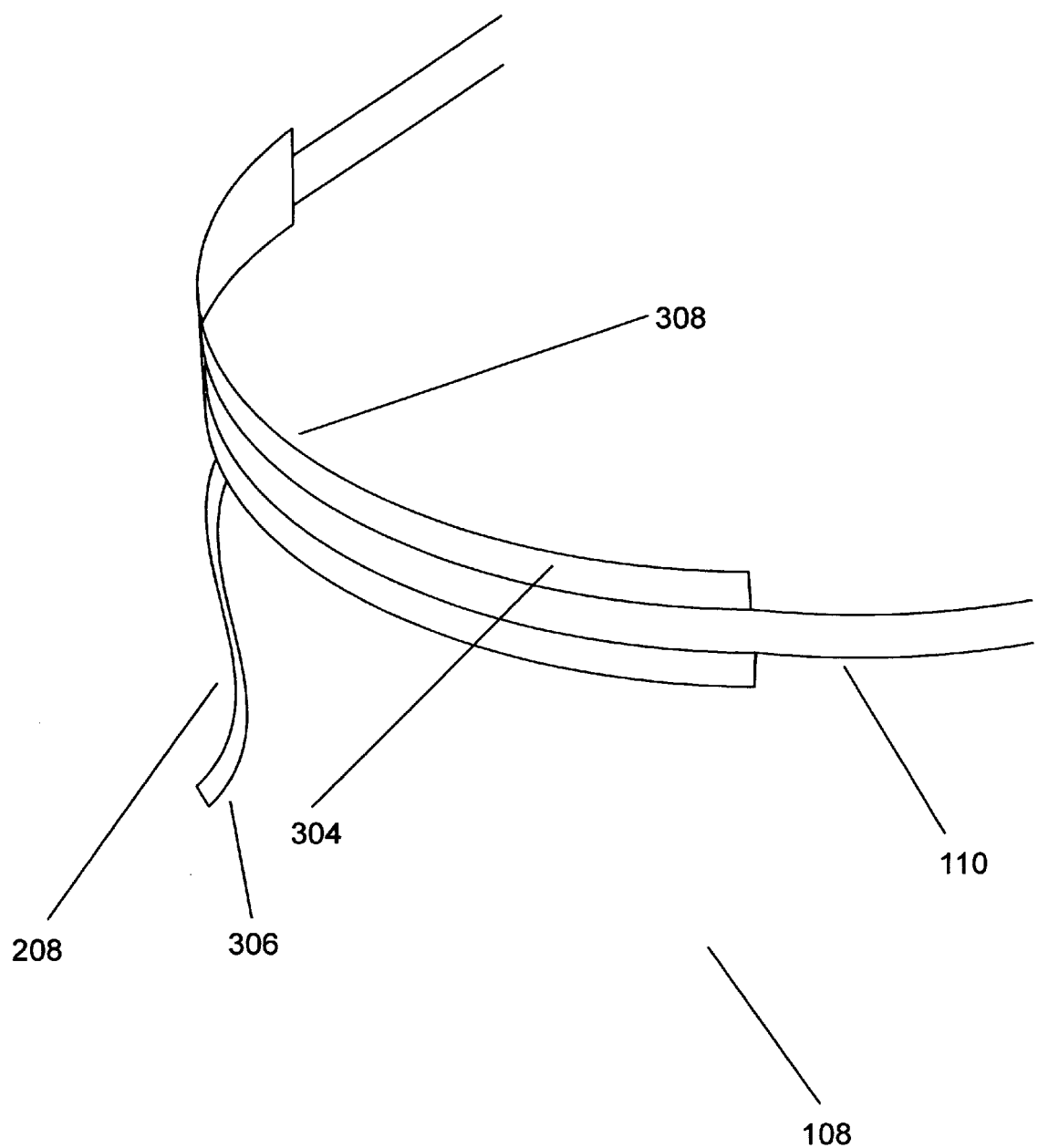
FIG. 3 is a perspective view illustrating a padded strap portion of one embodiment of the invention.

A collection bag attachment strap 208 is not shown in FIG. 1, but may be included as an integral or optional part of one embodiment of the device. This is shown in FIGS. 2 and 3. In an alternate embodiment, a container of moist wipes, and/or a gel hand disinfectant container (not shown), are attached to the strap.

A prototype of the invention was manufactured in January 2004. The prototype includes a double ended bag, about one foot long with an end opening circular diameter of about five inches, made of blue nylon cloth with white indicia printed thereon. The indicia include a proposed trade name THE WILD BARE, which is intended to be a mark of the inventor or his authorized licensee when the invention is made commercially available after filing of the present application. The printed indicia also state "Leave No Trace" and "Doing your business in the great outdoors doesn't have to be a balancing act". These slogans may also be used as trademarks on commercial embodiments of the product, with proper authorization. It will be understood that embodiments may bear other indicia, trademarks, logos, slogans, legal notices, and so on, or bear no indicia at all. It will also be understood that indicia may be on labels, tags, embroidered, or otherwise attached, instead of or in addition to being printed. Each end of the bag has a black nylon drawstring, ends knotted together, which can be held shut using a spring-loaded slidable black plastic squeeze clamp.

A section of nylon strap about nine inches long is sewn about three inches inside one end of the bag, by sewing each end of the section to a seam that runs lengthwise along the bag; the bag has two such seams opposite one another. The section, and the rest of the strap, is made of one inch wide black nylon ribbon. A strap 110 is sewn orthogonally to the middle of the nine inch section, about ten inches from one end of the strap. The entire strap from one end to the other is about eight and one half feet long. Silver metal hook 112 and loop 102 hardware pieces are sewn to the respective ends of the strap. The hook 112 used includes a springy metal bar that must be pushed slightly inward to allow the hook inside the loop 102, and that then springs back into position to help prevent the hook from accidentally slipping out of the eye. A slightly cushioned black nylon pad 108 about two and a half inches wide and about eighteen inches long is sewn onto the strap, at a position centered about twenty two inches from the point where the strap is attached to the section that is in turn attached to the bag interior. A collection bag attachment strap 208 is sewn to the outside face (away from user when device is in use) of the pad 108, to hang down at a right angle to the strap 110. The collection bag attachment strap 208 is made of a black nylon strap section about one foot long, with a releasable fabric hook-and-loop fastener closure section on the last three inches of its respective ends.

It will be understood that embodiments of the invention may depart from the prototype in various ways, as discussed herein and/or as apparent to those of skill in the art within the scope of the claims. To give but a few examples, embodiments may differ from the prototype in dimensions, colors, materials used, attachment points and/or means, the presence/absence of additional components such as the section of nylon strap about nine inches long (which is not shown in FIG. 1 but is indicated at 410 in FIG. 4), and the indicia, if any, used. This detailed description of the prototype is provided as one example, and is given in satisfaction of the legal requirements to be met by patents. It is not the only possible embodiment of the invention.

FIG. 2 shows a perspective view of one embodiment of the invention in a possible use. A user 200 is inside a loop formed by strap 110, which is wrapped around the user and a suitably strong and convenient structure such as a tree 212 (The user, 200, and the tree/support, 212 are shown in the figure to show the use of the mechanism, but neither the user 200 nor the tree 212 are intended to be a part of the invention). The strap is connected back to itself with the fastening mechanism that consists of loop 102, and hook 112. The user leans back slightly against the padded back band 108 for partial support; this also holds the strap (and hence the toilet paper and a waste collection bag 210) off the ground. The double ended bag and toilet tissue/paper 104 are within easy reached of the user.

One embodiment of the invention includes a means for waste collection in the form of a collection bag attachment strap 208 and a bag 210. Collection bag attachment strap 208 may include a small strap with a hook, or with fabric hook-and-loop fastener type material folded on itself, or a clamp, or an adhesive, or some other means for securing one portion of a collection bag 210 above the ground near the user for collecting the bodily waste as it falls or otherwise leaves the user's body before contacting the ground. The waste collection bag 210 may be any suitable container such as a plastic grocery sack, bag-within-a-bag, bag containing chemicals, enzymes, polymers, deodorants, lined box, or similar receptacle.

FIG. 3 is a perspective view of one embodiment of the invention's padded strap portion 108. A padded portion 304 is attached integrally to the strap 110 by sewing, adhesive, or other means. In an alternate embodiment (not illustrated), the padded portion has two or more slits through which the strap 110 is threaded, and the user is able to slide the padded portion to a desired position along the strap 110. One embodiment of the device includes a means 208 (collection bag attachment strap) for attaching a collection bag 210. One possible means is a small strap with fabric hook-and-loop fastener material on its ends 306, 308 so that the collection bag attachment strap 208 can be folded back on itself, at the same time capturing a portion of the collection bag, so that the bag then becomes secured to the device. Other methods for securing the collection bag could include a hook, a knot (knotting the bag around the strap 110, or lodging a knotted bag portion in a notched element similar to collection bag attachment strap 208 depending from the strap 110), a buckle or similar, using a small piece of rope, cord, webbing or similar, or directly without any additional extending material.

Figure 4:
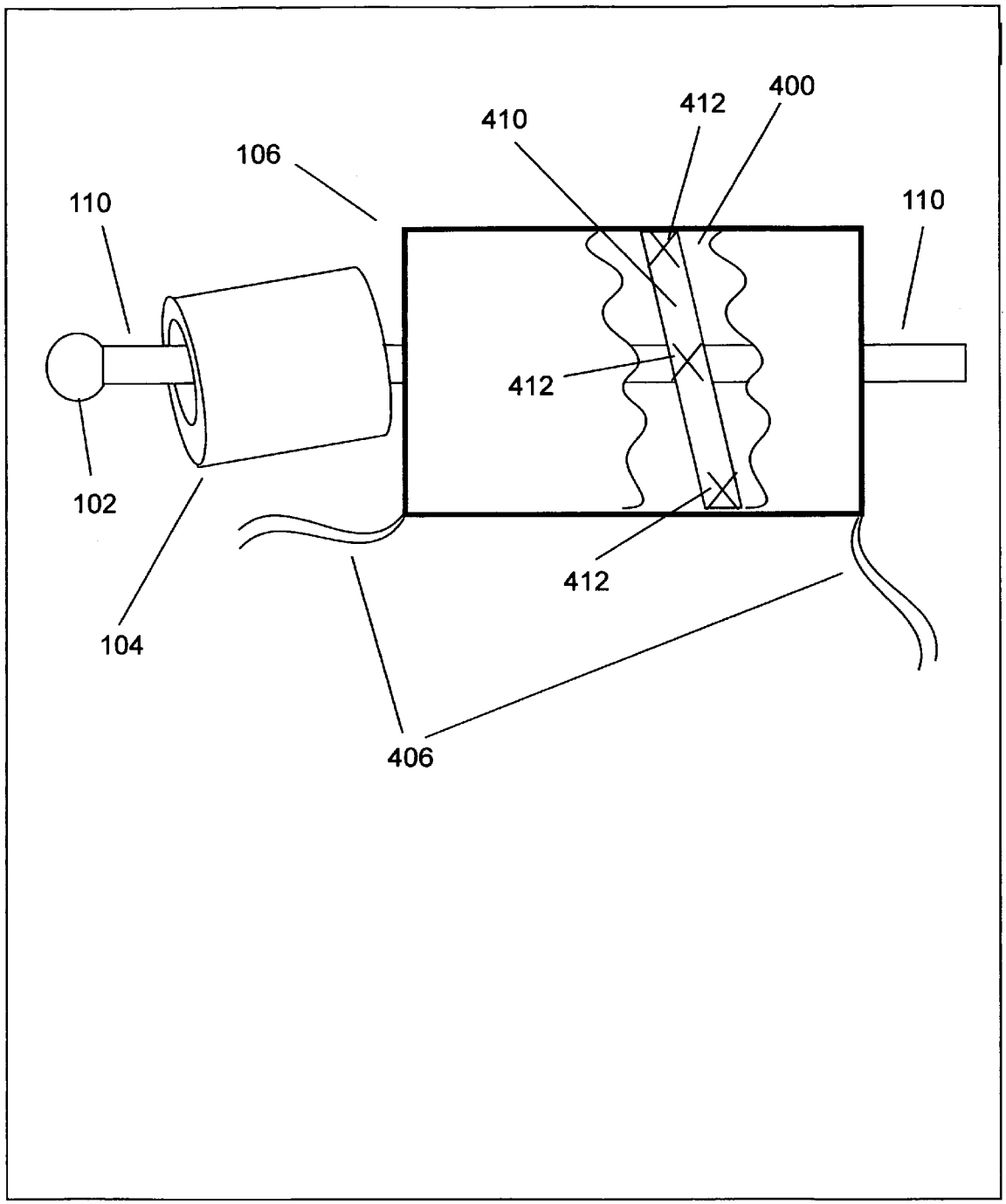
FIG. 4 is a perspective view illustrating a double ended bag portion of one embodiment of the invention.

FIG. 4 is a perspective view of one embodiment of the invention's double ended bag portion 106 with a cutaway portion 400. The double ended bag 106 has the strap 110 passing through its center and attached (in this embodiment) with another piece of material (such as a piece of webbing, strap, string, or fabric or similarly functioning material) 410. The "X"s 412 indicate a possible attachment method, namely, sewing. At each end of the double ended bag is a means for closing the bag 106 so that its contents remain contained inside it when the device is not in use. In the current invention one option for this closure is drawstrings 406. Other closure means may also be used. The roll of toilet paper 104 and the fastening mechanism consisting of hook 112, and loop 102, on the short end of the strap are shown for reference. The toilet paper may be stored inside the double ended bag, and then slid out for use.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope to the full extent permitted by law.

I claim:

1. A portable sling toilet for use by a human user, the portable sling toilet consisting essentially of A) a strap storage bag, having a longitudinal direction, and a lateral direction including an outermost left lateral side and an outermost right lateral side each of which define the outermost edge of the bag B) an integral strap attached through the middle of the strap storage bag and C) a waste collection bag attachment means for attaching a waste collection bag to the strap, wherein the strap storage bag has an open end on each respective lateral side of the bag and each open end includes a closure means and wherein the integral strap includes a short end and a long end wherein the short end includes a length sufficient for roll of toilet paper to be threaded there on and the long end includes at least a portion that has sufficient width or padding to provide comfort during use of the portable sling toilet wherein the portable sling toilet excludes a seat for the human user and wherein the strap, the waste collection bag, and a roll of toilet paper can all be stored within the storage bag, wherein the portable sling toilet further comprises a roll of toilet paper threaded onto the strap.

2. The portable sling toilet of claim 1, wherein the portable sling toilet consists essentially of the strap, the strap storage bag, the waste collection bag attachment means, and padding on the strap in a position that will help support the human user's back, and wherein the portable sling toilet still excludes a seat for the human user.

3. The portable sling toilet of claim 1, wherein the portable sling toilet consists essentially of the strap, the strap storage bag, the waste collection bag attachment means, and a strap fastening means for fastening ends of the strap together to form a loop, and wherein the portable sling toilet still excludes a seat for the human user.

4. The portable sling toilet of claim 1, wherein the portable sling toilet consists essentially of the strap, the strap storage bag, the waste collection bag attachment means, padding on the strap in a position that will help support the human user's back, and a strap fastening means for fastening ends of the strap together to form a loop, and wherein the portable sling toilet still excludes a seat for the human user.

5. The portable sling toilet of claim 1, wherein the portable sling toilet further comprises a water impermeable waste collection bag.

6. A portable sling toilet for use by a human user, the portable sling toilet consisting essentially of A) a strap storage bag, having a longitudinal direction, and a lateral direction including an outermost left lateral side and an outermost right lateral side each of which define the outermost edge of the bag B) an integral strap attached through the middle of the strap storage bag and C) a waste collection bag attachment means for attaching a waste collection bag to the strap, wherein the strap storage bag has an open end on each respective lateral side of the bag and each open end includes a closure means and wherein the integral strap includes a short end and a long end wherein the short end includes a length sufficient for roll of toilet paper to be threaded thereon and the long end includes at least a portion that has sufficient width or padding to provide comfort during use of the portable sling toilet wherein the portable sling toilet excludes a seat for the human user and wherein the strap, the waste collection bag, and a roll of toilet paper can all be stored within the storage bag, wherein the strap has sufficient length to wrap around a vertical support structure and a human user, wherein the strap has sufficient strength to bear a portion of the human user's weight as the human user stands and leans back against the strap after the strap is wrapped around the vertical support structure and the human user and wherein the portable sling toilet excludes a seat for the human user and functions for waste collection without a seat for the human user, wherein the portable sling toilet further comprises a roll of toilet paper threaded onto the strap, and wherein the portable sling toilet still excludes a seat for the human user and still functions for waste collection without a seat for the human user.

7. The portable sling toilet of claim 6, wherein the portable sling toilet further comprises a water impermeable waste collection bag, and wherein the portable sling toilet still excludes a seat for the human user and still functions for waste collection without a seat for the human user.

* * * * *